United States Patent
Ikeda et al.

(10) Patent No.: US 8,890,460 B2
(45) Date of Patent: Nov. 18, 2014

(54) SERVO CONTROL DEVICE (71) Applicants: Hidetoshi Ikeda, Chiyoda-ku (JP);
Yoshihiro Marushita, Chiyoda-ku (JP);
Koji Mahara, Chiyoda-ku (JP); Kiyoshi Hasegawa, Chiyoda-ku (JP); Hidemasa Ogi, Chiyoda-ku (JP)

(72) Inventors: Hidetoshi Ikeda, Chiyoda-ku (JP);
Yoshihiro Marushita, Chiyoda-ku (JP);
Koji Mahara, Chiyoda-ku (JP); Kiyoshi Hasegawa, Chiyoda-ku (JP); Hidemasa Ogi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/980,984

(22) PCT Filed: Oct. 25, 2012

(86) PCT No.: PCT/JP2012/077653
§ 371 (c)(1),
(2), (4) Date: Jul. 22, 2013

(87) PCT Pub. No.: WO2014/064815
PCT Pub. Date: May 1, 2014

(65) Prior Publication Data
US 2014/0117919 A1    May 1, 2014

(51) Int. Cl.
*G05B 5/01* (2006.01)
*G05B 6/02* (2006.01)

(52) U.S. Cl.
CPC ... *G05B 6/02* (2013.01); *G05B 5/01* (2013.01)
USPC ........... 318/611; 318/799; 318/823; 318/369; 318/721; 318/560

(58) Field of Classification Search
USPC ......... 318/799, 823, 721, 560, 556, 611, 170, 318/173, 189
See application file for complete search history.

(56) References Cited

U.S. PATENT DOCUMENTS

| | | | |
|---|---|---|---|
| 5,151,639 A | | 9/1992 | Hasegawa et al. |
| 2009/0261771 A1* | | 10/2009 | Pearce et al. .................. 318/573 |
| 2010/0079100 A1 | | 4/2010 | Kumagai et al. |

FOREIGN PATENT DOCUMENTS

| | | |
|---|---|---|
| JP | 03-233609 A | 10/1991 |
| JP | 04-201189 A | 7/1992 |
| JP | 2003-076426 A | 3/2003 |
| JP | 2010-088290 A | 4/2010 |
| JP | 2011-067016 A | 3/2011 |

* cited by examiner

*Primary Examiner* — Eduardo Colon Santana
*Assistant Examiner* — Iftekhar Mustafa
(74) *Attorney, Agent, or Firm* — Sughrue Mion, PLLC (57) ABSTRACT

A servo control device includes a follow-up control unit that controls a control target that drives a mechanical system by a motor, a command function unit that has input therein a phase signal θ indicating a phase of a cyclic operation performed by the control target, and that calculates a machine motion command according to the phase signal θ by a preset first function, a second derivative unit that uses a second function obtained by second-order differentiating the first function with respect to the phase signal to calculate a value of the second function according to the phase signal as a second-order differential base signal, a correction-value computation unit that computes a first command correction value for correcting the motor motion command by using a product of a square value of the phase velocity, the second-order differential base signal, and a first constant, and a correction-value addition unit that calculates the motor motion command based on an added value of the first command correction value and the machine motion command.

8 Claims, 3 Drawing Sheets

SERVO CONTROL DEVICE

CROSS REFERENCE TO RELATED APPLICATIONS

This is a National Stage of International Application No. PCT/JP2012/077653, filed Oct. 25, 2012, the contents of all of which are incorporated herein by reference in their entirety.

FIELD

The present invention relates to a servo control device that drives and controls a control target.

BACKGROUND

A servo control device that drives and controls an industrial machine, such as an industrial robot, a pressing device, and a line automation device, generates a command regarding a motion (a position and a speed) of a motor that drives a mechanical system, and controls the motion of the motor to follow the command. When the mechanical system has a low rigidity (such as when the mechanical system to be driven is an arm type or when a load machine is driven through a low-rigidity shaft or a decelerator), a deformation of a low-rigidity portion causes a difference between a motion of a distal end of the machine and the motion of the motor. Furthermore, when the mechanical system has a low rigidity, oscillations occur after the command changes to stop, or the like. Due to these causes, there is an error in the motion of the distal end of the machine relative to the command, and therefore control precision is degraded.

To solve the problems caused by the low rigidity as described above, there is a technology described in Patent Literature 1 to derive a second-order differential value of a position command value generated by a position command block with respect to time, and to multiply the second-order differential value by a gain constant in order to derive a correction value. A motor is controlled to follow a corrected position command value obtained by adding the correction value to an original position command value.

Furthermore, in the technology described in Patent Literature 1, it is described that a pseudo differential can be used instead of pure differential. Further, it is described that when a command speed shows a trapezoidal pattern, a time point at which command acceleration changes is extracted, and a preset time-series correction pattern is used to generate a correction value.

There is a case where the servo control device operates an industrial machine in a specific pattern in cycles that may not be necessarily regular. In such a case, a method including a command function unit, which is referred to as "electronic cam", is used for example. This method uses a phase signal that indicates a phase in a cycle and that increases or decreases with the elapsed time. The command function unit uses an equation or refers to a data table based on the phase signal to generate a cyclic position command. Therefore, the position command having the same shape pattern is repeatedly generated to the phase, and the motor position follows the position command. There is a technology described in Patent Literature 2 to further correct a position command by a servo control device using the command function unit as described above, thereby enhancing a control precision.

The technology described in Patent Literature 2 is to correct a command for the purpose of improving the control precision of the servo control device that cyclically operates in the same pattern. In this technique, a command function unit (a position pattern generator) having a phase signal (a phase command value) as an input is used to generate a cyclic position command (a position pattern). To correct a delay of a follow-up control unit (a position control system), the control function unit uses the position command in which the phase is advanced, and also calculates a correction value by multiplying a second-order differential value or a third-order differential value of the position command with respect to time by a coefficient.

Furthermore, in the technology described in Patent Literature 2, it is described that whether the correction value described above is added is selected according to the magnitude of an absolute value of the second-order differential value or the third-order differential value of the position command, thereby suppressing a superimposition of noise on the position command.

CITATION LIST

Patent Literatures

Patent Literature 1: Japanese Patent Application Laid-open No. 2003-76426

Patent Literature 2: Japanese Patent Application Laid-open No. 2011-67016

SUMMARY

Technical Problem

However, in the former conventional technology described above, there is a problem that when a second-order differential of a position command is performed, a signal becomes noise-like, and therefore a high-precision control is difficult. Furthermore, there is a problem that when a pseudo differential is used instead of pure differential as a solution to the noise problem, a phase delay occurs, and therefore the high-precision control is difficult. Further, in a method such as extracting a time point at which command acceleration changes to derive a correction value from a predetermined pattern, there is a problem that the method can only deal with a specific command shape.

In the latter conventional technology described above, a second-order differential or a third-order differential of a position command output from a command function unit with respect to time is used to compute a correction value. Therefore, there is a problem that the level of command noise becomes high, and accordingly the high-precision control is difficult. Furthermore, whether a correction of the position command is performed is selected according to the magnitude of a second-order differential value or a third-order differential value of the position command in order to deal with the noise problem. However, there is a problem that when the correction of the position command is eventually performed, it is influenced by the noise, and therefore the high-precision control is difficult.

The present invention has been achieved to solve the above problems, and an object of the present invention is to provide a servo control device that can control a cyclic operation of a control target with a high precision even when the control target has a low rigidity.

Solution to Problem

In order to solve above-mentioned problems and achieve the object, there is provided a servo control device including: a follow-up control unit that controls a motor to a control target configured with the motor and a mechanical system driven by the motor, so that motor motion corresponding to a position or a speed of the motor follows a motor motion command; a command function unit that has input therein a phase signal indicating a phase of a cyclic operation performed by the control target, and that calculates a machine motion command according to the phase signal by a preset first function; a second derivative unit that has the phase signal input therein, and that uses a second function preset as a second derivative that is a function obtained by second-order differentiating the first function with respect to the phase signal to calculate a value of the second function according to the phase signal as a second-order differential base signal; a correction-value computation unit that has input therein a phase velocity indicating a time differential value of the phase signal and the second-order differential base signal, and that computes a first command correction value for correcting the motor motion command by using a product of a square value of the phase velocity, the second-order differential base signal, and a first constant; and a correction addition unit that calculates the motor motion command based on an added value of the first command correction value and the machine motion command.

Advantageous Effects of Invention

According to the present invention, even when a control target has a low rigidity, a cyclic operation of the control target can be controlled with a high precision.

DESCRIPTION OF EMBODIMENTS

A servo control device according to embodiments of the present invention will be explained below in detail with reference to the accompanying drawings. The present invention is not limited to the embodiments.

First Embodiment

Figure 1:
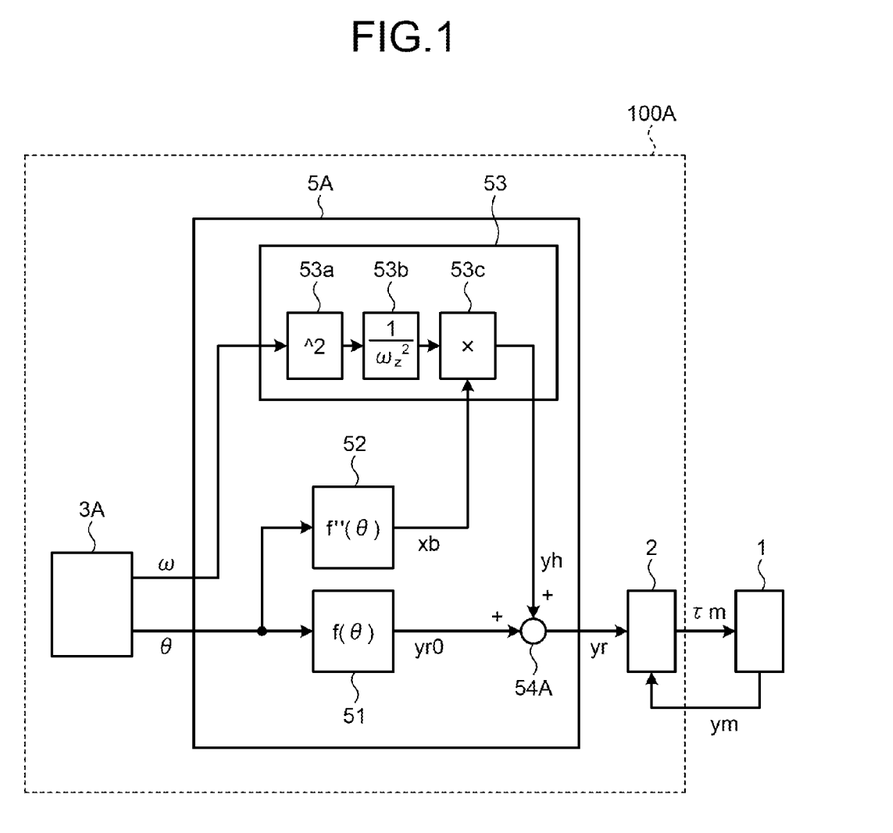
FIG. 1 is a block diagram of a configuration of a servo control device according to a first embodiment of the present invention.

FIG. 1 is a block diagram of a configuration of a servo control device according to a first embodiment of the present invention. A servo control device 100A according to the first embodiment is a device that drives and controls a motor (a motor 11 described later) and a control target 1 configured with a mechanical system driven by the motor 11.

The control target 1 is an industrial machine such as an industrial robot, a pressing device, and a line automation device, and includes the motor 11 and a mechanical system connected to the motor 11. The servo control device 100A uses an actuator such as a servo motor to drive and control the control target 1. The servo control device 100A generates a motor torque τm in the motor of the control target 1, thereby causing the control target 1 to perform a desired operation. Specifically, the servo control device 100A successively changes the motor torque τm based on a motor position ym detected by a detector (not shown), thereby controlling an operation position of the motor 11 so that the control target 1 performs a desired operation.

The servo control device 100A is configured to include a phase generation unit 3A, a command generating unit 5A, and a follow-up control unit 2. The phase generation unit 3A generates a phase signal θ indicating a phase of a cyclic operation performed by the control target 1, and a phase velocity ω indicating a change velocity of the phase signal θ, and outputs the phase signal θ and the phase velocity ω to the command generating unit 5A. The command generating unit 5A calculates a motor position command yr by a computation described later, and outputs the calculated motor position command yr to the follow-up control unit 2.

The follow-up control unit 2 has input therein the motor position command yr output from the command generating unit 5A and the motor position ym detected in the control target 1, and generates the motor torque τm so that the motor position ym follows the motor position command yr. That is, the follow-up control unit 2 generates and controls the motor torque τm so that motor motion indicated as the motor position ym follows the motor position command yr, that is, a motor motion command.

In the present embodiment, a case where the phase generation unit 3A is provided within the servo control device 100A is explained. However, the phase generation unit 3A is not necessarily provided within the servo control device 100A. For example, the servo control device 100A can have a configuration in which a signal of a rotation position of a rotating external device is externally input to the servo control device 100A to synchronize with the operation of the external device.

For example, the phase generation unit 3A integrates the phase velocity ω that is externally specified with respect to the elapsed time, thereby generating the phase signal θ, and outputs the phase velocity ω and the phase signal θ to the command generating unit 5A. For another example, the phase generation unit 3A can output the phase signal θ that is externally input and increases or decreases with time to the command generating unit 5A, and can also output the phase velocity ω corresponding to a time differential value of the phase signal θ to the command generating unit 5A. In this case, the phase generation unit 3A uses a filter having a sufficiently-large noise removal effect to compute the phase velocity ω so that a noise component, included in the phase signal θ and caused by a quantization or the like, is prevented from increasing due to a differential computation. In this manner, the phase generation unit 3A outputs the phase signal θ, and the phase velocity ω generated so as not to include a noise component, to the command generating unit 5A.

Next, a configuration and an operation of the command generating unit 5A are explained. The command generating unit 5A has input therein the phase signal θ and the phase velocity ω which are output from the phase generation unit 3A to calculate the motor position command yr, and outputs the calculated motor position command yr to the follow-up control unit 2. The command generating unit 5A is configured to include a command function unit 51, a second derivative unit 52, a correction-value computation unit 53, and a correction-value addition unit 54A.

In the command generating unit 5A, the phase signal θ output from the phase generation unit 3A is input to the command function unit 51 and the second derivative unit 52, and the phase velocity ω output from the phase generation unit 3A is input to the correction-value computation unit 53.

The command function unit 51 calculates a machine position command yr0 to the control target 1 based on the phase signal θ. At this time, the command function unit 51 uses a preset command function f(θ) to calculate the machine position command yr0. In other words, the command function unit 51 calculates a machine motion command according to the phase signal θ from the preset command function f(θ) (first function). The command function f(θ) is an equation or a data table, for example.

When the command function f(θ) is a data table, a correspondence relationship between a point (a value) of the phase signal θ and a point (a value) of the machine position command yr0 is set in advance in the data table. In the data table, a predetermined number of the correspondence relationships are set. The command function unit 51 interpolates reference values from the data table with respect to an arbitrary input value of the phase signal θ, thereby calculating the machine position command yr0. At this time, the command function unit 51 can calculate the machine position command yr0 easily by using linear interpolation. The command function unit 51 can also use a complicated spline interpolation or the like. The command function unit 51 outputs the calculated machine position command yr0 to the correction-value addition unit 54A.

In the second derivative unit 52, a function (second function) corresponding to a second derivative f"(θ) of the command function f(θ) is set in advance. The second derivative f"(θ) is a function obtained by second-order differentiating the command function f(θ) by the phase signal θ. The second derivative unit 52 calculates a value of the function corresponding to an input of the phase signal θ as a second-order differential base signal xb, and outputs the second-order differential base signal xb to the correction-value computation unit 53. The second function in the second derivative unit 52 is an equation or a data table for example, similarly to the command function f(θ). In some cases, the second function approximately indicates the second derivative f"(θ) of the command function f(θ). When it is not necessary to exactly describe the second function and the second derivative f"(θ), they are written without discriminating between them.

When the second function in the second derivative unit 52 is a data table, a correspondence relationship between a point (a value) of the phase signal θ and a point (a value) corresponding to the second derivative f"(θ), that is, a correspondence relationship between a point (a value) of the phase signal θ and a point (a value) of the second-order differential base signal xb is set in advance in the data table. The second derivative unit 52 interpolates reference values from the data table with respect to an arbitrary input value of the phase signal θ, thereby calculating the second-order differential base signal xb. The second derivative unit 52 outputs the calculated second-order differential base signal xb to the correction-value computation unit 53.

The correction-value computation unit 53 has the second-order differential base signal xb and the phase velocity ω input therein, and calculates a command correction value yh for correcting the machine position command yr0 by using the product of the square of the phase velocity ω, a predetermined constant (first constant), and the second-order differential base signal xb. The correction-value computation unit 53 outputs the calculated command correction value yh to the correction-value addition unit 54A. The predetermined constant is set according to a machine constant related to the rigidity or oscillations of the control target 1, and is set to be the inverse of the square of an anti-resonant frequency of the control target 1, which is described later.

The correction-value computation unit 53 includes a square computation unit 53a, a constant multiplication unit 53b, and a second-order differential multiplication unit 53c. In the correction-value computation unit 53, the square computation unit 53a calculates the square of the phase velocity ω, and outputs the calculated square of the phase velocity ω to the constant multiplication unit 53b. The constant multiplication unit 53b then multiplies the output from the square computation unit 53a by a predetermined constant (for example, a value based on the inverse of the square of an anti-resonant frequency $\omega_z$ of the control target 1). The constant multiplication unit 53b outputs the multiplied value to the second-order differential multiplication unit 53c. Furthermore, the second-order differential multiplication unit 53c multiplies the output from the constant multiplication unit 53b by the second-order differential base signal xb to calculate the command correction value yh. The second-order differential multiplication unit 53c then outputs the command correction value yh to the correction-value addition unit 54A.

The order of multiplications performed by respective units in the correction-value computation unit 53 is not particularly limited to the order described above. It suffices that the correction-value computation unit 53 calculates the command correction value yh to be the product of the square of the phase velocity ω, the inverse of the square value of the anti-resonant frequency $\omega_z$, and the second-order differential base signal xb.

The correction-value addition unit 54A adds the command correction value yh output from the correction-value computation unit 53 to the machine position command yr0 output from the command function unit 51, and outputs a result of the addition (an added value) to the follow-up control unit 2 as the motor position command yr. In this manner, the command generating unit 5A calculates the motor position command yr based on the phase signal θ and the phase velocity ω, and outputs the calculated motor position command yr to the follow-up control unit 2 through the operation described above.

The follow-up control unit 2 has input therein the motor position command yr output from the command generating unit 5A and the motor position ym detected from the control target 1. The follow-up control unit 2 generates the motor torque τm, while controlling a current of the motor 11 in the control target 1 so that the motor position ym follows and meets the motor position command yr. For example, the follow-up control unit 2 uses a cascade control configured with a motor position control, a motor speed control, and a motor current control.

Figure 2:
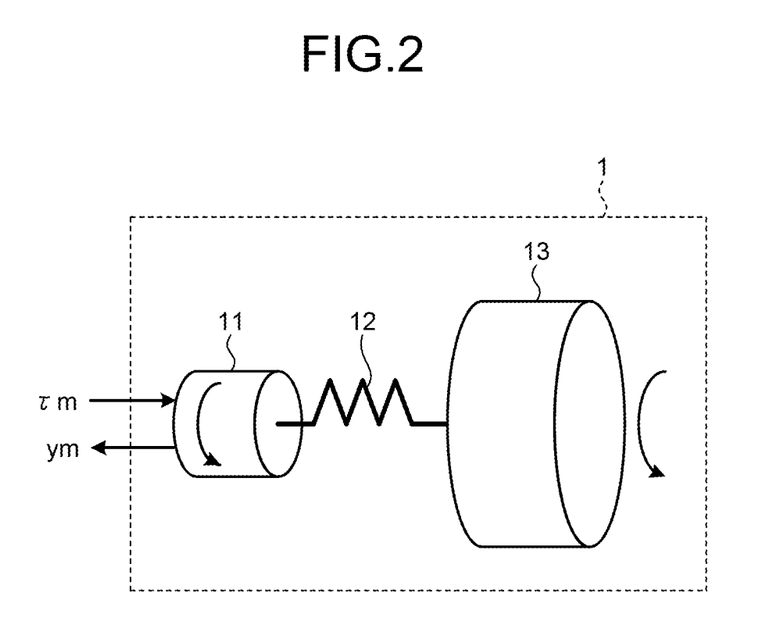
FIG. 2 is a schematic diagram of a configuration example of a control target.

Next, characteristics of the control target 1, which are considered in the present embodiment, are described in order to explain an effect obtained from the present embodiment. FIG. 2 is a schematic diagram of a configuration example of a control target.

In the control target 1, the motor 11 and a machine load 13 are coupled with an elastic portion 12 such as a shaft. In the control target 1, the motor 11 is driven by the motor torque τm generated by the servo control device 100A, and the machine load 13 is driven through the elastic portion 12.

Load inertia of the machine load 13 is represented as JL. A load position that is a position of the machine load 13 in operation is represented as yL. A spring constant of the elastic portion 12 is represented as Kg. A viscosity constant of the elastic portion 12 is represented as Cg. Motor inertia of the motor 11 is represented as JM.

A relationship between the load position yL and the motor position ym when the control target 1 is driven by the motor torque τm is expressed by the following equation (1). In the following equation, the symbol (s) indicates a Laplace operator that is equivalent to time differential.

$$yL/ym = 1/(s^2/\omega_z^2 + 2\zeta \cdot s/\omega_z + 1) \quad (1)$$

In the equation (1), $\omega_z$ indicates an anti-resonant frequency of the control target 1, and $\zeta$ indicates an attenuation coefficient, which are expressed by the following equation (2) and equation (3), respectively.

$$\omega_z = (Kg/JL)^{(1/2)} \quad (2)$$

$$\zeta = Cg/\{2(JL \cdot Kg)^{(1/2)}\} \quad (3)$$

A transfer function from the motor position command yr to the motor position ym as a result of the control by the operation of the follow-up control unit 2 is represented as G(s). That is, when the following equation (4) holds, a transfer function from the motor position command yr to the load position yL is expressed by the following equation (5).

$$ym/yr = G(s) \quad (4)$$

$$yL/yr = G(s)\{1/(s^2/\omega_z^2 + 2\zeta \cdot s/\omega_z + 1)\} \quad (5)$$

When the mechanical system in the control target 1 has a low rigidity, the attenuation coefficient $\zeta$ is normally much smaller than 1. Therefore, when the attenuation coefficient $\zeta$ is small enough to be negligible, the equation (5) can be approximated by the following equation (6).

$$yL/yr = G(s)\{1/(s^2/\omega_z^2 + 1)\} \quad (6)$$

Therefore, even when the response of the follow-up control unit 2 is made very fast and very precise (even when the transfer function G(s) is made close to 1), the equation (6) includes a second resonance characteristics. Accordingly, it is understood that there is an error in the response of the load position yL, and the response of the load position yL shows an oscillatory behavior at the anti-resonant frequency $\omega_z$ with respect to the change in the motor position command yr. Consequently, the anti-resonant frequency $\omega_z$ corresponds to an oscillation frequency of the mechanical system.

Next, characteristics of the command generating unit 5A are explained in detail. The command generating unit 5A performs the operation described above, thereby calculating the command correction value yh expressed by the following equation (7) with respect to an input of the phase signal $\theta$.

$$yh = f''(\theta) \cdot \omega^2/\omega_z^2 \quad (7)$$

Time differential of the machine position command yr0 (that is $f(\theta)$) is described. A first-order differential value and a second-order differential value of the machine position command yr0 are expressed by the following equation (8) and equation (9), respectively.

$$df(\theta)/dt = \{df(\theta)/d\theta\}(d\theta/dt) \quad (8)$$

$$d^2f(\theta)/dt^2 = \{d^2f(\theta)/d\theta^2\}(d\theta/dt)^2 + \{df(\theta)/d\theta\}(d^2\theta/dt^2) \quad (9)$$

When the phase velocity $\omega$ that is a time differential value of the phase signal $\theta$ is constant or when a change in the phase velocity $\omega$ is sufficiently small during a given period, the equation (9) is expressed the following equation (10).

$$d^2f(\theta)/dt^2 = \{d^2(\theta)/d\theta^2\}(d\theta/dt)^2 \quad (10)$$

In the equation (10), when $d^2f(\theta)/d\theta^2$ is replaced with $f''(\theta)$, $d\theta/dt$ is replaced with $\omega$, $f(\theta)$ is replaced with yr0, and a time differential is replaced with the operator (s), the equation (10) is replaced with the following equation (11). The equation (7) expressing the command correction value yh is expressed by the following equation (12).

$$s^2 yr0 = f''(\theta)\omega^2 \quad (11)$$

$$yh = (s^2/\omega_z^2)yr0 \quad (12)$$

As described above, in practice, although a time differential computation is not performed on the machine position command yr0, the command correction value yh can be computed equally as a signal obtained by multiplying a second-order differential value of the machine position command yr0 with respect to time by a predetermined constant.

Because the motor position command yr is the sum of yr0 and yh, a transfer function from the machine position command yr0 to the motor position command yr is expressed by the following equation (13). As a result, a transfer function from the machine position command yr0 to the load position yL is expressed by the following equation (14) by combining the equation (6) and the equation (13).

$$yr/yr0 = (s^2/\omega_z^2 + 1) \quad (13)$$

$$yL/yr0 = G(s) \quad (14)$$

Therefore, the response of the follow-up control unit 2 is made very fast and very precise, and the transfer function G(s) is made close to 1, thereby making it possible to control the load position yL to follow the machine position command yr0 very fast and very precisely even when the control target 1 has a low rigidity.

The characteristics of the command generating unit 5A are obtained by setting the predetermined constant in the constant multiplication unit 53b by using the anti-resonant frequency $\omega_z$ that is mechanical characteristics of the control target 1 (for example, mechanical characteristics related to the rigidity or oscillation frequency). For example, the characteristics of the command generating unit 5A can be set externally according to the mechanical characteristics of the control target 1, thereby realizing high-precision control of the control target 1.

The anti-resonant frequency $\omega_z$ corresponds to an oscillation frequency of the control target 1. Therefore, for example, the servo control device 100A can be configured to automatically measure the oscillation frequency within the servo control device 100A to set the anti-resonant frequency $\omega_z$ in the command generating unit 5A.

In principle, the effect of the high-speed and high-precision control described above can be obtained when the transfer function from the machine position command yr0 to the motor position command yr is expressed by the equation (13). This feature is the same as in the method described in Patent Literature 1 in principle.

Meanwhile, one of characteristics of the servo control device 100A according to the present embodiment is to use the second derivative unit 52, in which a function relative to the phase signal $\theta$ is set, to calculate the second-order differential base signal xb, and to compute the command correction value yh as the product of the square of the phase velocity $\omega$, the second-order differential base signal xb, and a predetermined constant. As described above, the servo control device 100A computes the command correction value yh expressed by the equation (12) without directly performing second-order time differential.

For a comparison between the conventional technique and the servo control device 100A, a case where second-order time differential as expressed by the equation (12) is actually computed in real time is assumed. In an actual computation in the servo control device 100A, a numerical computation is used, in which the number of significant figures is finite. In that case, a quantization noise mixes into at the time of computing the phase signal $\theta$ in the phase generation unit 3A, in contrast to an ideal value. Furthermore, in the command function unit 51, the quantization noise caused by a rounding error or a truncation error mixes into each of four arithmetic computations in the process of outputting the machine position command yr0 from the phase signal θ (the process of performing an interpolation computation based on reference of the data table).

When a second-order differential computation, such as a double time differential, is performed on the machine position command yr0 having the quantization noise mixed therein, a component of the quantization noise is increased so greatly that the machine position command yr0 as is cannot be used in a computation of the command correction value yh. Further, when a filter is used in a real-time computation to suppress the quantization noise, a delay is caused by the filter. Therefore, it is difficult to realize the high-precision control.

In contrast, in the present embodiment, the command correction value yh is calculated based on a reference value of the second derivative unit 52 in which a function or a data table relative to the phase signal θ is set. Accordingly, an increase in the noise component caused by a numerical quantization and a time differential can be suppressed. As a result, the high-precision control can be easily realized without adding a filter or the like.

In this manner, the servo control device 100A calculates the second-order differential base signal xb that corresponds to a second-order differential value of the machine position command yr0 with respect to the phase signal θ, in the second derivative unit 52. The servo control device 100A then calculates the command correction value yh by multiplying the second-order differential base signal xb by the square of the phase velocity ω generated in the phase generation unit 3A so as not to include a noise component and by a predetermined constant. In this manner, the servo control device 100A can also respond to a change in the phase velocity ω (a change in the cycle of the cyclic operation performed by the control target 1), and realize control characteristics equal to those obtained by using second-order time differential of the machine position command yr0. Furthermore, because time differential is not performed in an actual computation, the motor position command yr in which a noise component of a signal is suppressed can be calculated.

Even though a slow low-pass filter for removing the noise is used in a computation of the phase velocity ω in the phase generation unit 3A, when the phase velocity ω changes gradually, a delay caused by the low-pass filter exerts a small influence on a computation of the command correction value yh. Therefore, the servo control device 100A can remove an adverse influence of the noise without degrading the control precision.

In the present embodiment, there has been explained a case where the command function f(θ) in the command function unit 51 and the second derivative f"(θ) in the second derivative unit 52 are calculated by a preset data table and an interpolation computation. A method of creating this data table is not particularly limited. In a case where the command function f(θ) and the second derivative f"(θ) can be computed by an equation relative to the phase signal θ, a problem caused by calculation time in a real-time operation can be avoided by creating the data table even when the computation is very complicated. Furthermore, when a data table corresponding to the second derivative f"(θ) is created in advance, a high-precision floating-point arithmetic or the like is used to compute the data table. Therefore, the data table can be created without mixing any noise error therein. Accordingly, the high-precision control can be realized without causing any problem of the high-frequency noise.

Further, as the function f(θ) to be set in the command function unit 51, a numerical table relative to the finite number of points of the phase signal θ can be set without using a numerical equation. In this case, a cyclic operation in an arbitrary pattern, which is difficult to be expressed by the numerical equation, can be easily set. In such a case, assuming that as a simple method based on the data table of the command function f(θ) in the command function unit 51, a difference computation between the adjacent points of the phase signal θ is doubly performed to derive a data table corresponding to the second derivative f"(θ), then a high-frequency component in an area of the phase signal θ can be sometimes excessively increased.

When the high-frequency component is excessively increased, a filter smoothing operation is necessary. However, it suffices that the smoothing operation is performed off-line prior to a real-time computation. Therefore, it is possible to suppress the high-frequency component without causing any phase error.

Specifically, a method referred to as "zero-phase filter" is used in a filter computation performed on the area of the phase signal θ. That is, a filter computation having characteristics of suppressing a high-frequency component of the phase signal θ is applied doubly in the normal direction and in the reverse direction of the phase signal θ. Therefore, a function corresponding to the second derivative f" (θ) in the second derivative unit 52 can be created while suppressing a high-frequency component without causing any phase error. As a result, at the time of a computation in a real-time operation for performing data table reference and an interpolation computation in the second derivative unit 52, a high-precision real-time computation can be performed on frequency characteristics around the anti-resonant frequency $\omega_z$, which exert a significant influence on oscillations of the control target 1 and on a control error therein, without increasing a level of high-frequency noise of an output signal. Therefore, it is possible to realize the high-precision control.

In the present embodiment, there has been explained a case where the function f(θ) in the command function unit 51 and a function corresponding to f"(θ) in the second derivative unit 52 are set as a data table relative to a predetermined number of points of the phase signal θ. However, an equation computation can be set as the command function f(θ) and the second derivative f"(θ). For example, when the command function f(θ) and the second derivative f"(θ) can be realized by a function capable of being computed in real time, it is not necessary to set a data table, and an equation computation relative to the phase signal θ can be performed.

In the present embodiment, there has been explained a case where the servo control device 100A performs a position control. Specifically, the command function unit 51 having the phase signal θ input therein calculates the machine position command yr0, the correction-value computation unit 53 having the phase signal θ and the phase velocity ω input therein calculates the command correction value yh, and the correction-value addition unit 54A calculates the motor position command yr. The follow-up control unit 2 then controls the control target 1 so that the motor position ym follows the motor position command yr.

The servo control device 100A can operate in the speed dimension with the same configuration. In that case, exactly the same effects as those obtained when the servo control device 100A performs the position control are obtained. In this case, the command function unit 51 having the phase signal θ input therein calculates a machine speed command as a machine motion command, the correction-value computation unit 53 having the phase signal θ and the phase velocity ω input therein calculates a speed command correction value, and the correction-value addition unit 54A calculates a motor speed command as a motor motion command. The follow-up control unit 2 then controls the control target 1 so that a motor speed that is motor motion follows the motor speed command.

As described above, according to the first embodiment, the high-precision control can be realized without causing any noise problem due to a quantization of a command signal, while suppressing oscillations and a control error caused by a low rigidity of the control target 1 that is cyclically operated, and also responding to a cycle change. Therefore, even when the control target 1 has a low rigidity, it is possible to control a cyclic operation of the control target 1 with the high precision.

Second Embodiment

Figure 3:
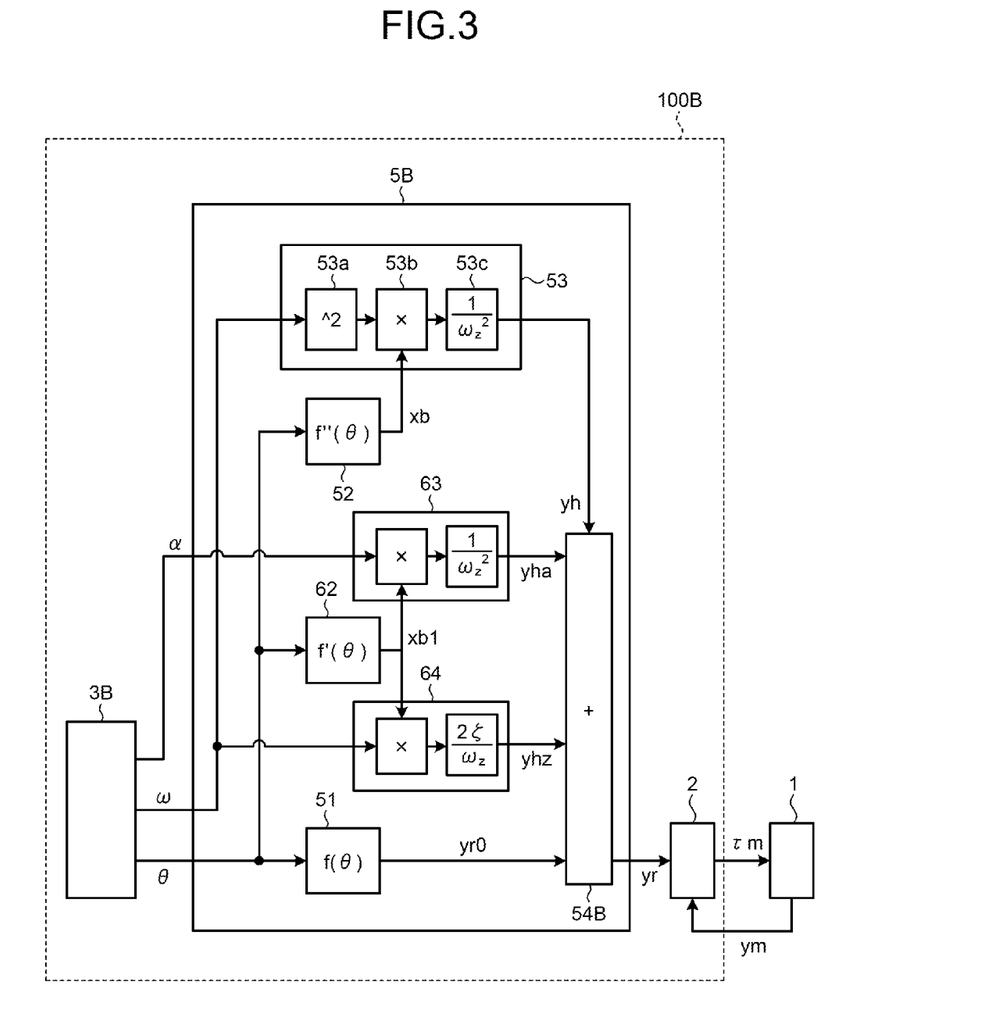
FIG. 3 is a block diagram of a configuration of a servo control device according to a second embodiment of the present invention.

Next, a second embodiment of the present invention is explained with reference to FIG. 3. FIG. 3 is a block diagram of a configuration of a servo control device according to the second embodiment of the present invention. Among respective constituent elements shown in FIG. 3, constituent elements that realize functions identical to those of the servo control device 100A shown in FIG. 1 and described in the first embodiment are denoted by same reference signs and redundant explanations thereof will be omitted.

A servo control device 100E according to the second embodiment performs more complicated setting and computation than the servo control device 100A, thereby realizing higher-precision control than the servo control device 100A. The servo control device 100E according to the present embodiment includes a first derivative unit 62 and an accelerating correction-value computation unit 63, thereby improving a control precision even when the phase velocity ω indicating a change velocity of the phase signal θ is not constant. Furthermore, the servo control device 100B includes the first derivative unit 62 and an attenuation correction-value computation unit 64, thereby improving the control precision even when oscillation characteristics of the control target 1 is attenuated to a large extent.

The servo control device 100B is configured to include a phase generation unit 3B, a command generating unit 5B, and the follow-up control unit 2. The phase generation unit 3B outputs the phase signal θ and the phase velocity ω to the command generating unit 5B similarly to the phase generation unit 3A in the first embodiment. The phase generation unit 3B also outputs a phase acceleration α corresponding to a time differential value of the phase velocity ω to the command generating unit 5B. It is possible to output the phase acceleration α without including any noise-like component by using a method such as presetting the phase acceleration α as a time-series pattern.

The command generating unit 5B has the phase signal θ, the phase velocity ω, and the phase acceleration α input therein to calculate the motor position command yr, and outputs the calculated motor position command yr to the follow-up control unit 2. The command generating unit 5B is configured to include the command function unit 51, the second derivative unit 52, the correction-value computation unit 53, a correction-value addition unit 54B, the first derivative unit 62, the accelerating correction-value computation unit 63, and the attenuation correction-value computation unit 64.

In the command generating unit 5B, the phase signal θ output from the phase generation unit 3B is input to the command function unit 51, the second derivative unit 52, and the first derivative unit 62. The phase velocity ω output from the phase generation unit 3B is input to the correction-value computation unit 53 and the attenuation correction-value computation unit 64. Furthermore, the phase acceleration α output from the phase generation unit 3B is input to the accelerating correction-value computation unit 63.

In the first derivative unit 62, a third function corresponding to a first derivative f'(θ) of the command function f(θ) in the command function unit 51 is set in advance. The third function corresponding to the first derivative f'(θ) is a function obtained by first-order differentiating the command function f(θ) with respect to the phase signal θ. The first derivative unit 62 outputs a value of the third function corresponding to an input of the phase signal θ as a first-order differential base signal xb1 to the accelerating correction-value computation unit 63 and the attenuation correction-value computation unit 64. The third function corresponding to the first derivative f'(θ) is an equation or a data table for example, similarly to the command function f(θ) and the second derivative f''(θ).

When the third function corresponding to the first derivative f'(θ) is a data table, a predetermined number of correspondence relationships between a point (a value) of the phase signal θ and a point (a value) of the first-order differential base signal xb1 are set in advance in the data table. The first derivative unit 62 interpolates reference values from the data table with respect to an arbitrary input value of the phase signal θ, thereby calculating the first-order differential base signal xb1. The first derivative unit 62 outputs the calculated first-order differential base signal xb1 to the accelerating correction-value computation unit 63 and the attenuation correction-value computation unit 64.

The accelerating correction-value computation unit 63 has the first-order differential base signal xb1 and the phase acceleration α input therein to calculate the product of the first-order differential base signal xb1, the phase acceleration α, and a predetermined constant (a second constant) as an accelerating correction value yha. The accelerating correction-value computation unit 63 outputs the calculated accelerating correction value yha to the correction-value addition unit 54B.

The predetermined constant used in the accelerating correction-value computation unit 63 is set according to a machine constant related to the rigidity or oscillations of the control target 1, similarly to the predetermined constant used in the correction-value computation unit 53 in the first embodiment. For example, the predetermined constant used in the accelerating correction-value computation unit 63 is set to be an inverse of the square of the anti-resonant frequency $\omega_z$ of the control target 1. Therefore, the accelerating correction value yha is computed by using the following equation (15).

$$yha = f'(\theta) \cdot \alpha / \omega_z \qquad (15)$$

A second-order differential value of the machine position command yr0 (that is f(θ)) with respect to time is expressed by the equation (9) as explained in the first embodiment. When the condition in which a change in the phase velocity ω is sufficiently small, which is assumed in the first embodiment, is not satisfied, the equation (9) is replaced with the following equation (16). By using the equation (7) and the equation (15), a sum of the command correction value yh and the accelerating correction value yha is expressed by the following equation (17).

$$s^2 yr0 = f''(\theta)\omega^2 + f'(\theta)\alpha \qquad (16)$$

$$yh + yha = (s^2/\omega_z^2) yr0 \qquad (17)$$

The attenuation correction-value computation unit 64 has the first-order differential base signal xb1 and the phase velocity ω input therein to calculate the product of the first-order differential base signal xb1, the phase velocity ω, and a predetermined constant (a third constant) as an attenuation correction value yhz. The attenuation correction-value computation unit 64 outputs the calculated attenuation correction value yhz to the correction-value addition unit 54B.

The predetermined constant in the attenuation correction-value computation unit 64 is based on a value obtained by multiplying a doubled attenuation coefficient $\zeta$ of the control target 1 by the inverse of the anti-resonant frequency $\omega_z$, for example. Because the following equation (18) holds by using the equation (8) in the first embodiment, the attenuation correction value yhz to be computed is expressed by the following equation (19).

$$s \cdot yr0 = f'(\theta)\omega \qquad (18)$$

$$yhz = (2\zeta \cdot s/\omega_z) yr0 \qquad (19)$$

The correction-value addition unit 54B adds the command correction value yh output from the correction-value computation unit 53, the accelerating correction value yha output from the accelerating correction-value computation unit 63, and the attenuation correction value yhz to the machine position command yr0 output from the command function unit 51, and outputs a result of the addition to the follow-up control unit 2 as the motor position command yr. Based on the equation (17) and the equation (19), a transfer function from the machine position command yr0 to the motor position command yr is calculated by the following equation (20).

$$yr/yr0 = (s^2/\omega_z^2 + 2\zeta s/\omega_z + 1) \qquad (20)$$

Therefore, even when the phase acceleration $\alpha$ indicating a change in the phase velocity $\omega$ is not negligible or when the attenuation coefficient $\zeta$ of the control target 1 is not negligible, a transfer function from the machine position command yr0 to the load position yL can be expressed by the equation (14) by combining the equation (6) and the equation (20) similarly to the first embodiment.

As a result, the response of the follow-up control unit 2 is made very fast and very precise, and the transfer function G(s) is made close to 1, thereby making it possible to control the control target 1 so that the load position yL follows the machine position command yr0 very fast and very precisely.

In the present embodiment, there has been explained a case where the command correction value yh, the accelerating correction value yha, and the attenuation correction value yhz are all added to the machine position command yr0, thereby calculating the motor position command yr. However, a method of calculating the motor position command yr is not limited thereto. It suffices that the command generating unit 5B adds at least one of the accelerating correction value yha and the attenuation correction value yhz to the added value of the machine position command yr0 and the command correction value yh, thereby calculating the motor position command yr.

For example, when the accelerating correction value yha is not added at the time of calculating the motor position command yr, the accelerating correction-value computation unit 63 is not necessary. Furthermore, when the attenuation correction value yhz is not added at the time of calculating the motor position command yr, the attenuation correction-value computation unit 64 is not necessary.

As described above, according to the second embodiment, even when a change in the phase velocity $\omega$ is not negligible or even when the attenuation coefficient $\zeta$ of oscillation characteristics of the control target 1 is not negligible, a high-precision control can be realized without causing any noise problem due to a quantization of a command signal, while suppressing oscillations and a control error caused by a low rigidity of the control target 1 that is cyclically operated, and also responding to a cycle change.

Industrial Applicability

As described above, the servo control device according to the present invention is suitable for controlling a control target that drives a mechanical system by a motor.

Reference Signs List

1 control target, 2 follow-up control unit, 3A, 3B phase generation unit, 5A, 5B command generating unit, motor, 12 elastic portion, 13 machine load, 51 command function unit, 52 second derivative unit, 53 correction-value computation unit, 53a square computation unit, 53b constant multiplication unit, 53c second-order differential multiplication unit, 54A, 54B correction-value addition unit, 62 first derivative unit, 63 accelerating correction-value computation unit, 64 attenuation correction-value computation unit, 100A, 100B servo control device.

The invention claimed is:

1. A servo control device comprising:
a follow-up control unit that controls a motor with respect to a control target configured with the motor and a mechanical system driven by the motor, so that motor motion of the motor follows a motor motion command based on a motor position or a motor speed;
a command function unit that has input therein a phase signal indicating a phase of a cyclic operation performed by the control target, and that calculates a machine motion command according to the phase signal by a preset first function;
a second derivative unit that has the phase signal input therein, and that uses a second function preset as a second derivative that is a function obtained by second-order differentiating the first function with respect to the phase signal to calculate a value of the second function according to the phase signal as a second-order differential base signal;
a correction-value computation unit that has input therein a phase velocity indicating a time differential value of the phase signal and the second-order differential base signal, and that computes a first command correction value for correcting the machine motion command by using a product of a square value of the phase velocity, the second-order differential base signal, and a first constant; and
a correction-value addition unit that calculates the motor motion command based on an added value of the first command correction value and the machine motion command.

2. The servo control device according to claim 1, wherein the first constant is configured to be externally set according to mechanical characteristics of the control target.

3. The servo control device according to claim 1, wherein the first constant is a value based on an inverse of a square value of an anti-resonant frequency corresponding to an oscillation frequency of the control target.

4. The servo control device according to claim 1, wherein the second function is a first data table indicating a correspondence relationship between the phase signal and the second-order differential base signal, and
the second derivative unit uses the first data table to calculate the second-order differential base signal.

5. The servo control device according to claim 1, further comprising:
a first derivative unit that has the phase signal input therein, and that uses a third function preset as a first derivative that is a function obtained by differentiating the first function with respect to the phase signal to calculate a value of the third function according to the phase signal as a first-order differential base signal; and an accelerating correction-value computation unit that has input therein a phase acceleration indicating a time differential value of the phase velocity and the first-order differential base signal, and that calculates a second command correction value for correcting the machine motion command by using a product of the first-order differential base signal, the phase acceleration, and a second constant, wherein the correction-value addition unit calculates the motor motion command based on an added value of the first and second command correction values and the machine motion command.

6. The servo control device according to claim 5, wherein the second constant is a value based on an inverse of a square value of an anti-resonant frequency corresponding to an oscillation frequency of the control target.

7. The servo control device according to claim 1, further comprising:

a first derivative unit that has the phase signal input therein, and that uses a third function preset as a first derivative that is a function obtained by differentiating the first function with respect to the phase signal to calculate a value of the third function according to the phase signal as a first-order differential base signal; and an attenuation correction-value computation unit that has input therein the first-order differential base signal and the phase velocity, and that calculates a third command correction value for correcting the motor motion command by using a product of the first-order differential base signal, the phase velocity, and a third constant, wherein the correction-value addition unit calculates the motor motion command based on an added value of the first and third command correction values and the machine motion command.

8. The servo control device according to claim 7, wherein the third constant is a value based on a product of an attenuation coefficient of the control target and an inverse of an anti-resonant frequency corresponding to an oscillation frequency of the control target.

* * * * *